United States Patent
Ringström et al.

(10) Patent No.: US 11,170,916 B2
(45) Date of Patent: Nov. 9, 2021

(54) COVER

(71) Applicant: Lear Corporation, Southfield, MI (US)

(72) Inventors: Carl Ringström, Jönköping (SE); Mats Bergstedt, Gotebor (SE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/592,259

(22) Filed: Oct. 3, 2019

(65) Prior Publication Data
US 2020/0143962 A1    May 7, 2020

Related U.S. Application Data

(60) Provisional application No. 62/755,811, filed on Nov. 5, 2018.

(51) Int. Cl.
| | |
|---|---|
| *H01B 17/58* | (2006.01) |
| *H01R 11/28* | (2006.01) |
| *H02G 15/06* | (2006.01) |
| *B60R 16/03* | (2006.01) |

(52) U.S. Cl.
CPC .......... *H01B 17/58* (2013.01); *H01R 11/284* (2013.01); *H02G 15/06* (2013.01); *B60R 16/03* (2013.01)

(58) Field of Classification Search
CPC ...... H01R 13/52; H01R 13/5213; H01R 4/70; H01R 11/284; H01B 17/58; H02G 15/06; B60R 16/03
USPC ......................................................... 439/521
See application file for complete search history.

(56) References Cited

U.S. PATENT DOCUMENTS

| | | |
|---|---|---|
| D318,459 S | 7/1991 | Hamaguchi et al. |
| 5,169,338 A | 12/1992 | Dewar et al. |
| 5,413,500 A | 5/1995 | Tanaka |
| 5,439,759 A | 8/1995 | Lippert et al. |
| 5,503,642 A | 4/1996 | Lippert et al. |
| 5,576,516 A | 11/1996 | Kameyama et al. |
| 5,645,448 A | 7/1997 | Hill |
| 5,791,936 A | 8/1998 | Nicholson |
| 5,977,485 A | 11/1999 | Yoshimura et al. |
| 6,361,348 B1 | 3/2002 | Hall et al. |
| 6,376,771 B1 | 4/2002 | Kosuge |
| 6,426,465 B1 | 7/2002 | Kosuge |
| 6,512,177 B2 | 1/2003 | Kosuge |
| 6,533,619 B2 | 3/2003 | Wakata et al. |

(Continued)

FOREIGN PATENT DOCUMENTS

EP           2498342 A2    9/2012

*Primary Examiner* — Gary F Paumen
(74) *Attorney, Agent, or Firm* — Fishman Stewart PLLC

(57) ABSTRACT

A cover includes a first portion and a second portion. The first portion may include a first section and/or a second section. The second portion may include a first section and/or a second section. The first section of the first portion and the first section of the second portion may be rotatably connected to each other, and/or the first section of the first portion and the second section of the first portion may be rotatably connected to each other. The first section of the first portion and/or the first section of the second portion may be configured to rotate about a first axis. The first section of the first portion and/or the second section of the first portion may be configured to rotate about a second axis. The first axis may be substantially perpendicular to the second axis. The first section of the second portion may include a first latch and/or a second latch.

20 Claims, 7 Drawing Sheets

(56) References Cited

U.S. PATENT DOCUMENTS

| | | |
|---|---|---|
| 6,576,838 B2 | 6/2003 | Matsumura |
| 6,705,889 B2 | 3/2004 | Nishimoto |
| 6,828,058 B2 | 12/2004 | Ohtsuka et al. |
| 7,285,011 B2 | 10/2007 | Hardy et al. |
| 7,361,841 B1 | 4/2008 | Smolen et al. |
| 8,188,368 B2 | 5/2012 | Suzuki |
| 8,192,229 B2 | 6/2012 | Endo |
| 8,436,247 B2 | 5/2013 | Mase |
| 8,491,328 B2 * | 7/2013 | Mulfinger ............ H01R 13/516 439/447 |
| 8,556,650 B2 | 10/2013 | Ikeda et al. |
| 8,962,171 B2 | 2/2015 | Fukunaga |
| 9,837,735 B2 | 12/2017 | Carnick et al. |
| 10,103,526 B2 | 10/2018 | Suzuki et al. |
| 10,135,229 B2 | 11/2018 | Matsumura et al. |
| 10,680,378 B2 | 6/2020 | Miyazawa |
| 2016/0006003 A1 | 1/2016 | Ohashi et al. |
| 2017/0125750 A1 | 5/2017 | Tsukiyoshi |
| 2017/0214171 A1 | 7/2017 | Gabet et al. |
| 2019/0375347 A1 | 12/2019 | Kotani |

\* cited by examiner

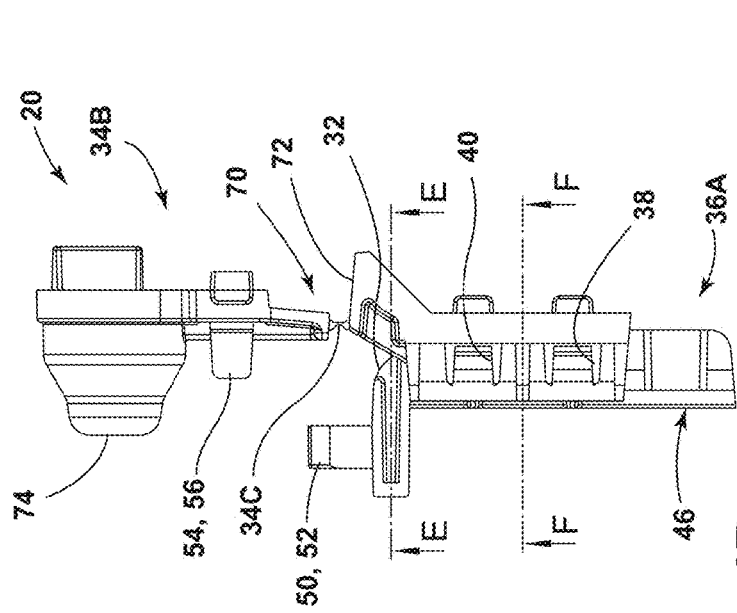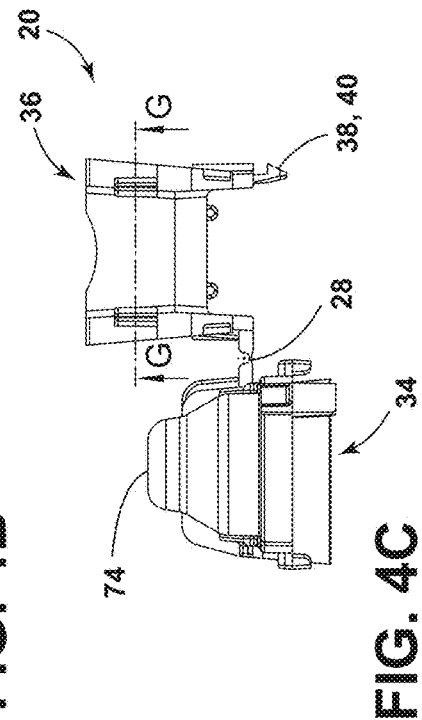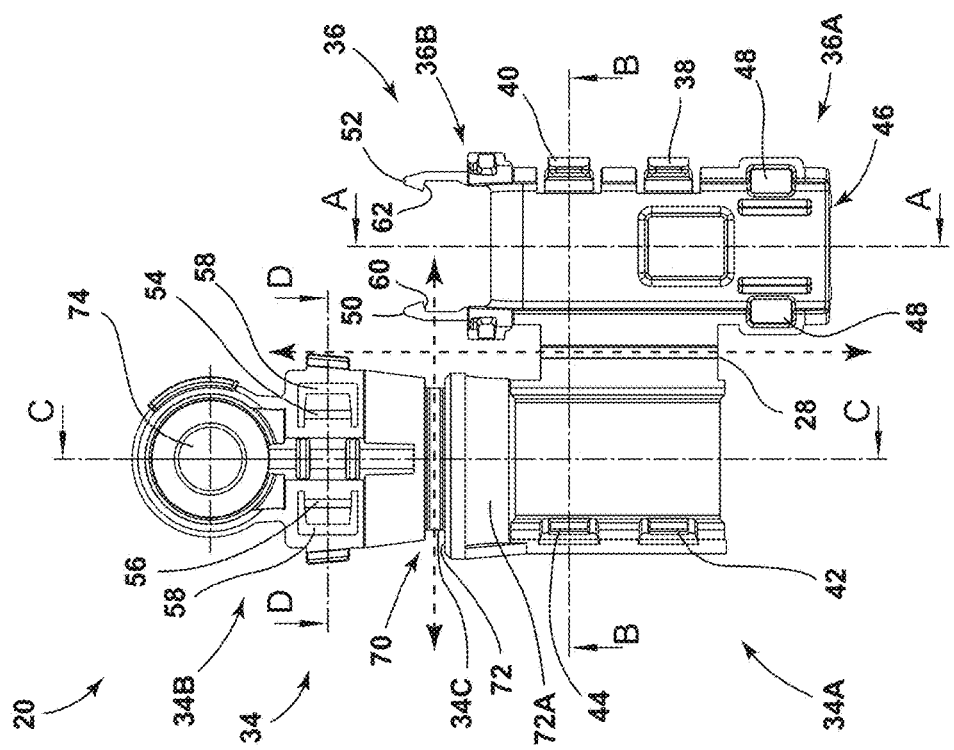
FIG. 4B
FIG. 4C
FIG. 4A

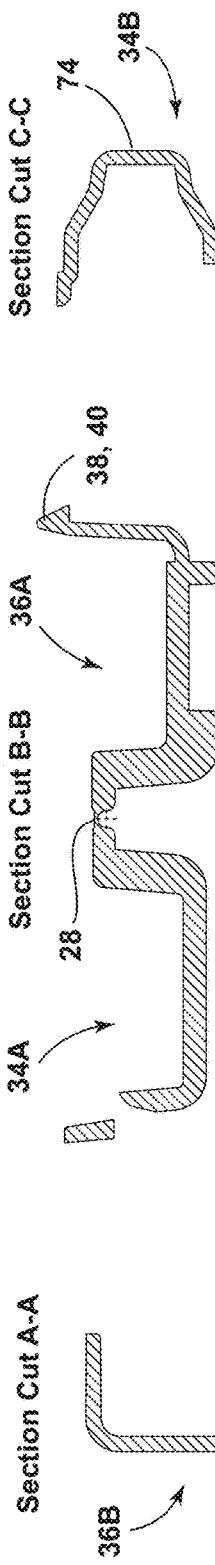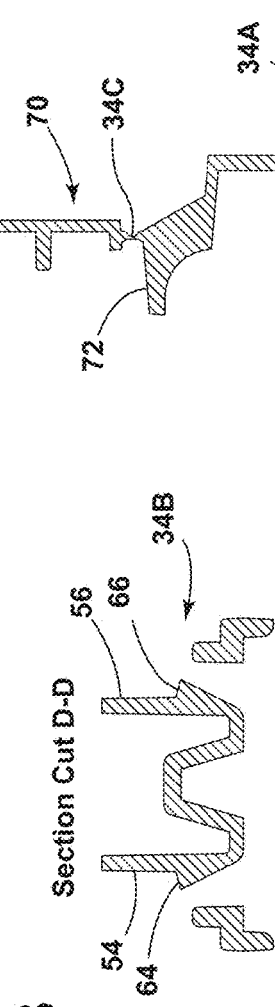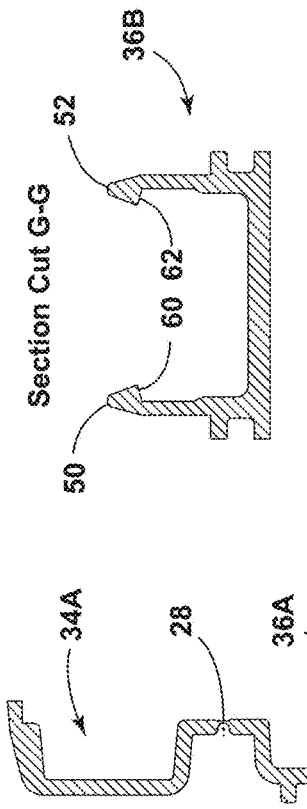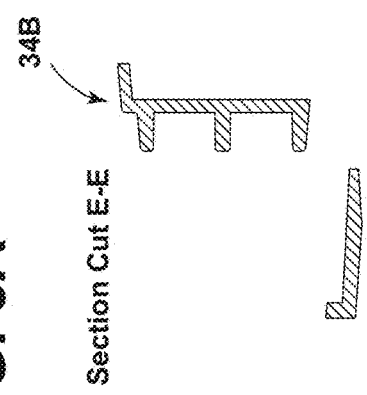

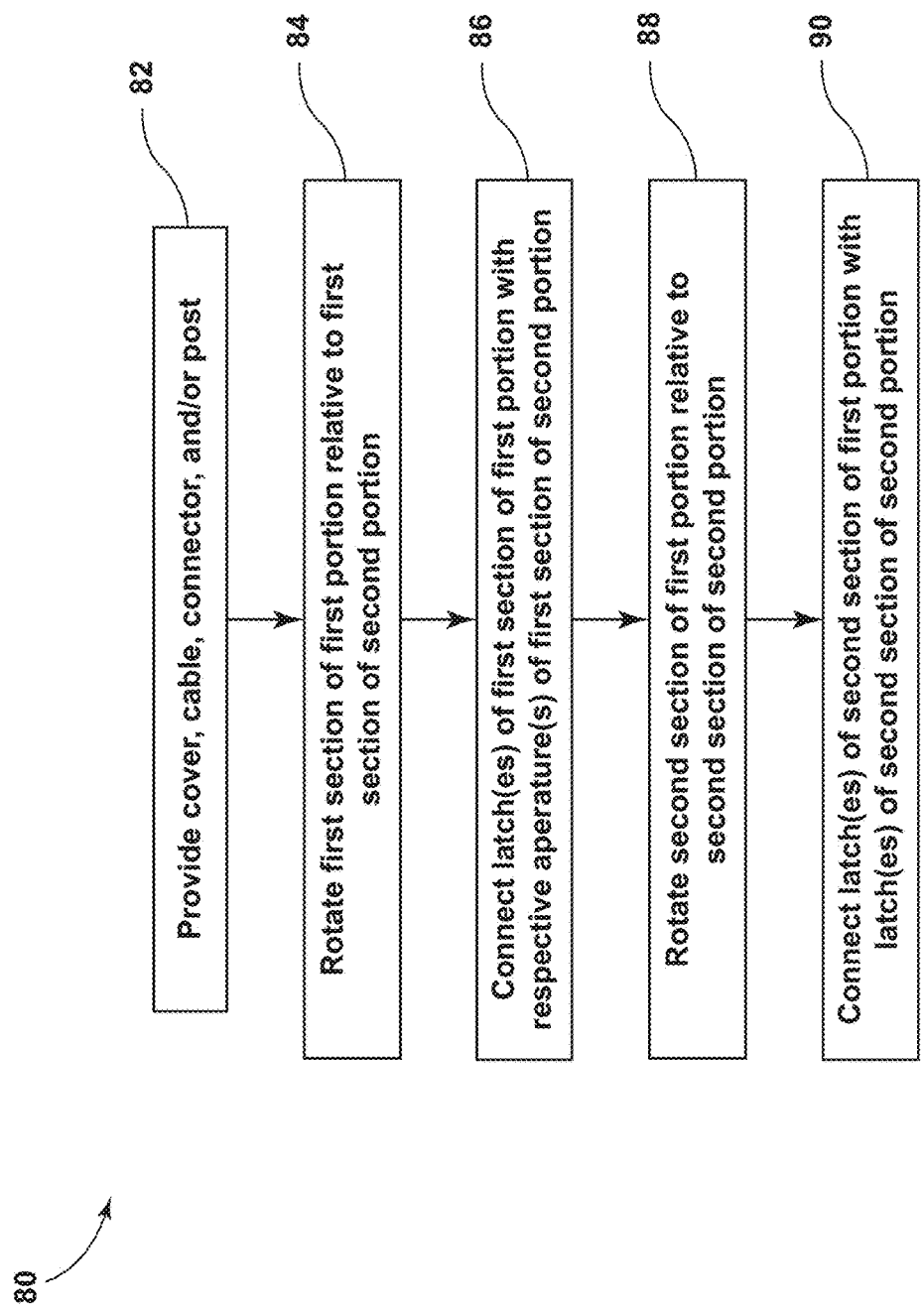

COVER

CROSS-REFERENCE TO RELATED APPLICATION

This application claims the benefit of U.S. Provisional Patent Application Ser. No. 62/755,811, filed on Nov. 5, 2018, the disclosure of which is hereby incorporated by reference in its entirety as though fully set forth herein.

TECHNICAL FIELD

The present disclosure generally relates to covers, including covers that may be used to cover electrical cables and/or connectors, such as in a vehicle.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some covers do not provide adequate protection and/or do not include sufficient connection features.

There is a desire for solutions/options that minimize or eliminate one or more challenges or shortcomings of covers. The foregoing discussion is intended only to illustrate examples of the present field and is not a disavowal of scope.

SUMMARY

In embodiments, a cover may include a first portion including a first section and/or a second section, and/or a second portion including a first section and/or a second section. The first section of the first portion and the first section of the second portion may be rotatably connected to each other (e.g., a connection between two bodies allowing the movement of the bodies relative to each other around or about an axis). The first section of the first portion and the second section of the first portion may be rotatably connected to each other. The first section of the first portion and/or the first section of the second portion may be configured to rotate about a first axis. The first section of the first portion and/or the second section of the first portion may be configured to rotate about a second axis. The first axis may be substantially perpendicular to the second axis. The first section of the second portion may include a first latch and/or a second latch that may be configured to engage corresponding apertures of the first section of the first portion to connect the first section of the first portion to the first section of the second portion.

With embodiments, the second section of the second portion may include a third latch and/or a fourth latch that may be configured to engage a fifth latch and/or a sixth latch of the second section of the first portion to connect the second section of the first portion to the second section of the second portion. The fifth latch and/or the sixth latch may be configured for actuation to release the third latch and/or the fourth latch. The fifth latch and/or the sixth latch may be configured to be actuated in opposite directions to release the third latch and/or the fourth latch. The third latch, the fourth latch, the fifth latch, and/or the sixth latch may each include an engagement surface. The second section of the first portion may be configured to be disengaged from the second section of the second portion when (i) the engagement surface of the third latch is not in contact or aligned with the engagement surface of the fifth latch, and/or (ii) the engagement surface of the fourth latch is not in contact or aligned with the engagement surface of the sixth latch. The second section of the first portion may include a cap configured to at least partially cover an electrical post.

In embodiments, the cover may include a first configuration and/or a second configuration. The first portion may not be engaged with the second portion when the cover is in the first configuration; and/or the first portion may be engaged with the second portion when the cover is in the second configuration. The first section of the first portion may be engaged with the first section of the second portion when the cover is in the second configuration; and/or the second section of the first portion may be engaged with the second section of the second portion when the cover is in the second configuration. When the cover is in the second configuration, the cover may be configured to protect one or more electrical components disposed inside of the cover. The first section of the second portion may include an extension having one or a plurality of connecting member apertures. The extension may extend beyond the first section of the first portion. The cover may include a hinge, and/or the hinge may be configured to rotatably connect the first section of the first portion with the first section of the second portion. The hinge may be configured to permit relative rotation of the first section of the first portion and the first section of the second portion of about 180 degrees.

With embodiments, the cover may include a second hinge, and/or the second hinge may be configured to rotatably connect the second section of the first portion to the first section of the first portion. The second hinge may be configured to permit relative rotation of the second section of the first portion and the first section of the first portion of at least about 90 degrees. The cover may be configured as a monolithic component. The cover may be substantially L-shaped when in the second configuration.

In embodiments, a method of connecting a cover may include providing a cover, a cable, a connector, and/or a post. The cover may include a first portion including a first section and/or a second section. The cover may include a second portion that may include a first section and/or a second section. The method may include connecting the first section of the first portion with the first section of the second portion by rotating at least one of the first section of the first portion and the first section of the second portion about a first axis. The method may include connecting the second section of the first portion with the second section of the second portion by rotating at least one of the second section of the first portion and the second section of the second portion about the first axis and a second axis. The first axis may be substantially perpendicular to the second axis. Connecting the first section of the first portion with the first section of the second portion may include a first latch and/or a second latch of the first section of the second portion substantially engaging a first aperture and/or a second aperture of the first section of the first portion. Connecting the second section of the first portion with the second section of the second portion may include a third latch and/or a fourth latch of the second section of the second portion substantially engaging a fifth latch and/or a sixth latch of the second section of the first portion. The method may include disengaging the second section of the first portion from the second section of the second portion. Disengaging may include bending the fifth latch and/or the sixth latch towards a center of the second section of the first portion. The cover may be configured as a monolithic component and/or the cover may be substantially L-shaped when the first portion is engaged with the second portion.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIGS. 4A, 4B, and 4C are side views generally illustrating an embodiment of a cover in an open position according to teachings of the present disclosure.

FIGS. 5A, 5B, 5C, 5D, 5E, 5F, and 5G are cross-sectional views of portions of the embodiment of a cover of FIGS. 4A, 4B, and 4C.

FIG. 6 is a flowchart of an embodiment of a method of connecting a cover according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
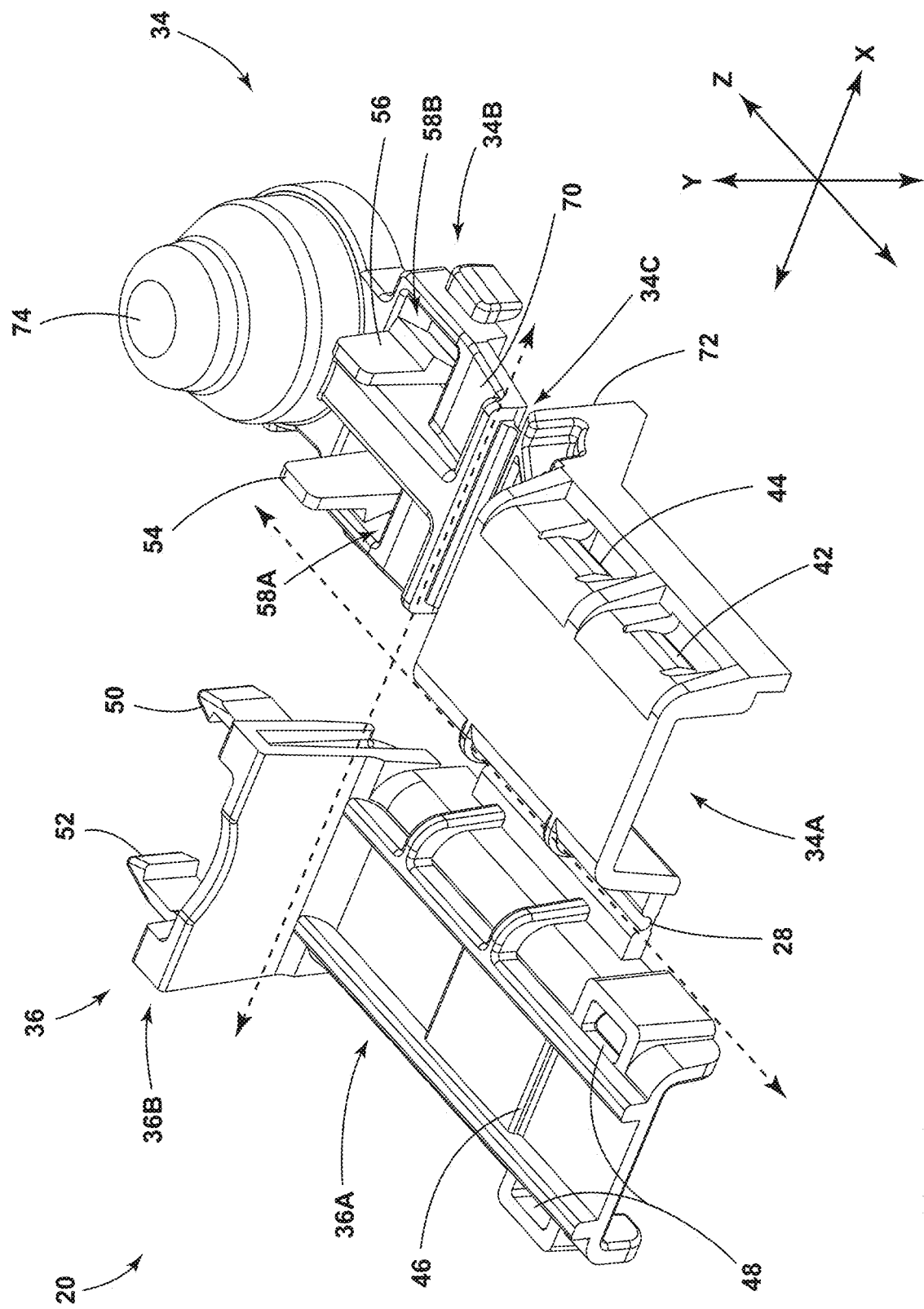
FIG. 1 is a perspective view generally illustrating an embodiment of a cover in an open configuration according to teachings of the present disclosure.
Figure 2A:
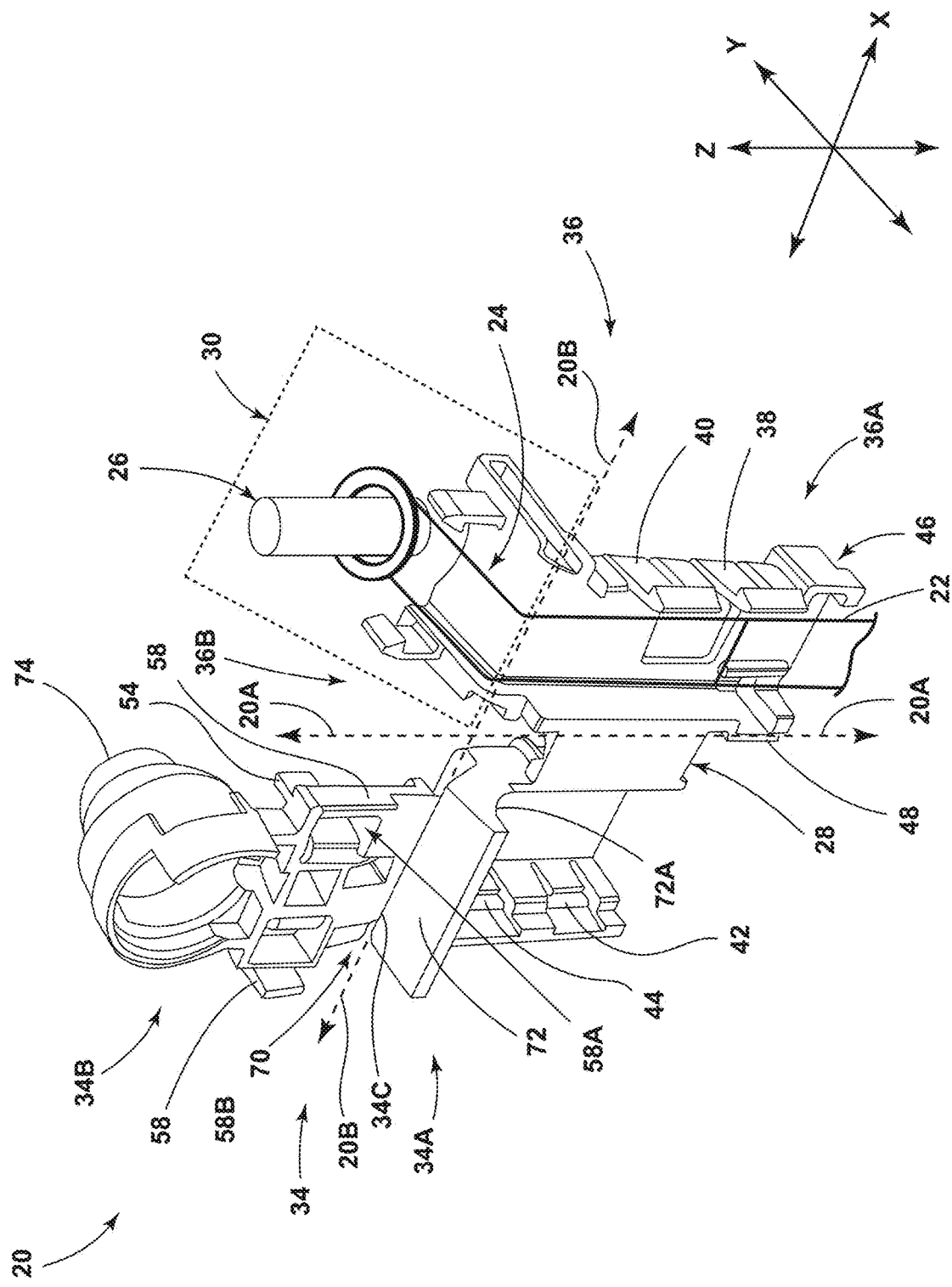
FIG. 2A is a perspective view generally illustrating embodiments of a cover in an open configuration, a cable, a connector, a post, and a generator according to teachings of the present disclosure.

In embodiments, such as generally illustrated in FIGS. 1 and 2A, a cover 20 may include a first/top portion 34 and/or a second/bottom portion 36. A cover 20 may be configured to cover one or more electrical components, such as portions of a cable 22 (e.g., a battery cable), an associated connector 24, and/or an electrical terminal/post 26 (e.g., of an alternator/generator or other electrical component 30) to which the cable 22 and/or the connector 24 may be connected (see, e.g., FIG. 2A). The cover 20 may be configured to protect the cable 22, the connector 24, and/or the terminal 26, from external interference (e.g., mechanical and/or electrical).

With embodiments, such as generally illustrated in FIGS. 1 and 2A, the cover 20 may be initially provided and/or formed in an open configuration. For example and without limitation, in an open configuration, portions of a cable 22, a connector 24, and/or an electrical terminal 26 may be inserted into the cover 20. The cover 20 may provide limited protection to and/or may not be fully connected to portions of a cable 22, a connector 24, and/or an electrical terminal 26 when the cover 20 is in the open configuration. The cover 20 may move between an open configuration and a closed configuration. When the cover 20 is in the closed position, such as generally illustrated in FIG. 3, the cover 20 may be configured to protect portions of a cable 22, connector 24, and/or electrical terminal 26 from interference (e.g., may limit or substantially prevent inadvertent electrical connection/shorting).

Figure 2B:
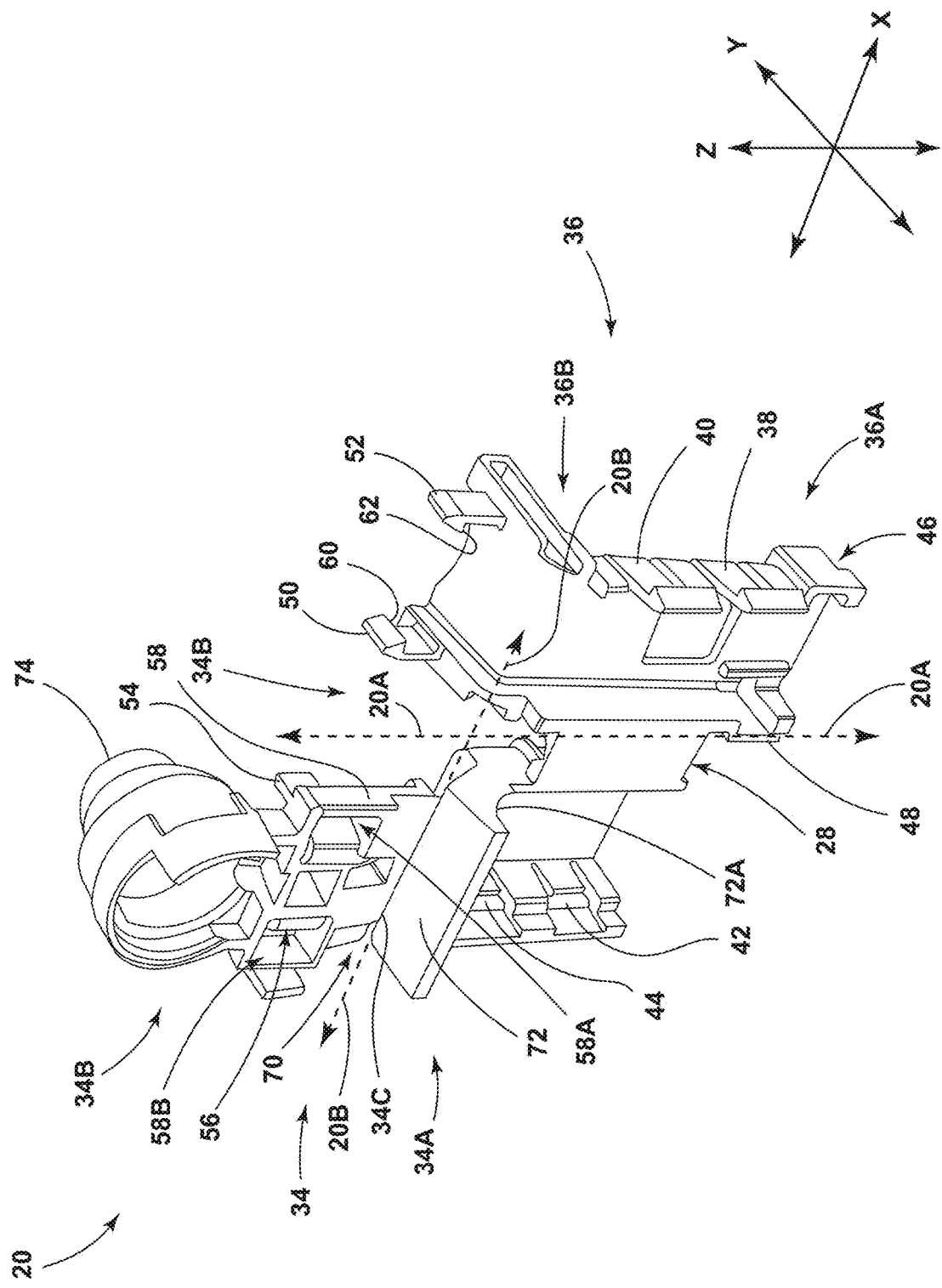
FIG. 2B is a perspective view generally illustrating an embodiment of a cover in an open configuration according to teachings of the present disclosure.
Figure 3:
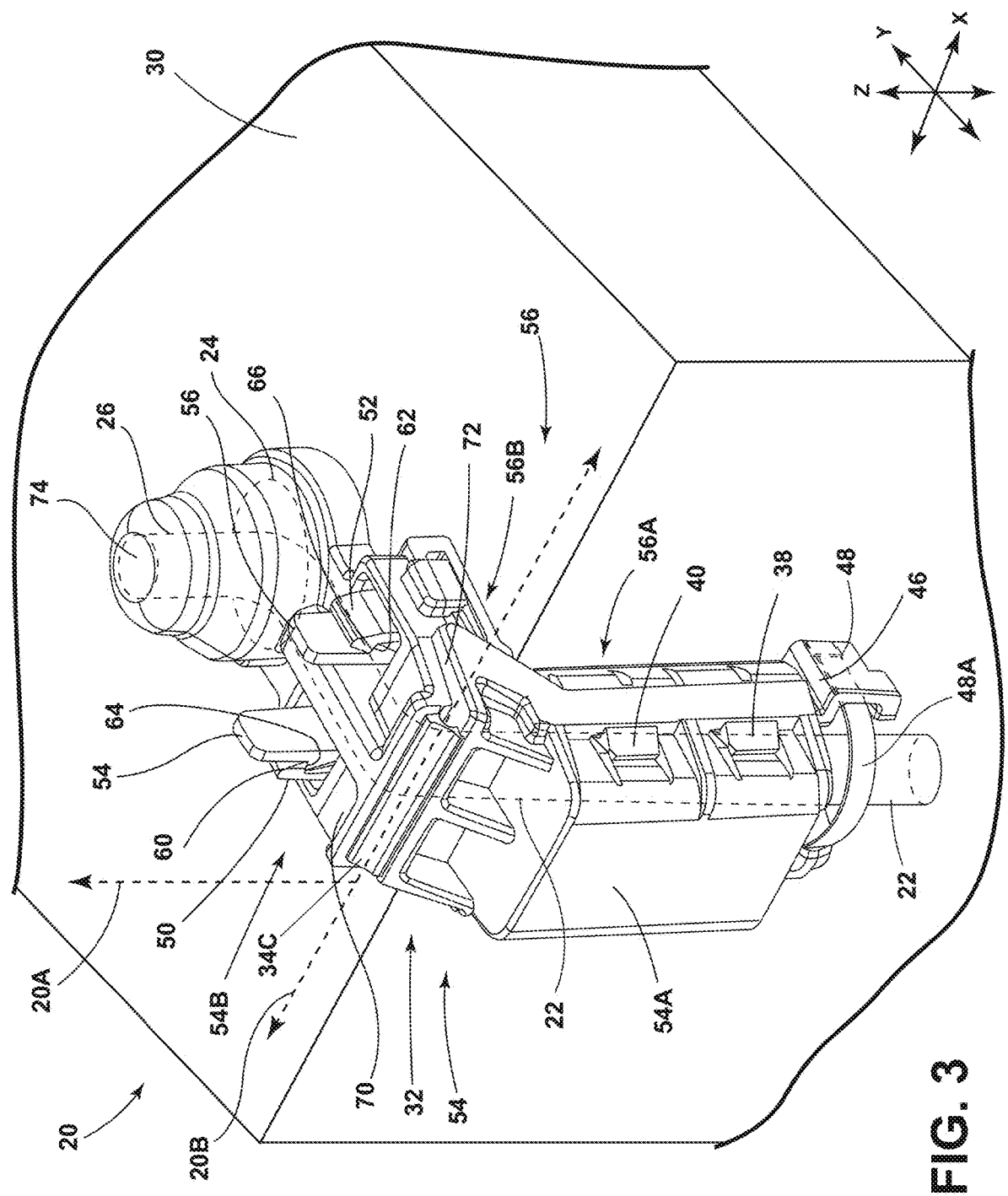
FIG. 3 is a perspective view generally illustrating an embodiment of a cover in a closed configuration according to teachings of the present disclosure.

With embodiments, such as shown in FIGS. 2A, 2B, and 3, a cover 20 may be configured to cover one or more electrical components 22, 24, 26 when in a closed configuration. The cover 20 may be configured to protect the one or more electrical components 22, 24, 26 from contact with other components. For example and without limitation, the cover 20 may protect the one or more electrical components 22, 24, 26 from external factors (e.g., electrical and/or physical interference). The cover 20 may move between the open configuration and the closed configuration via a hinge 28. The hinge 28 may be substantially disposed along and/or parallel with the Z-direction. The hinge 28 may be configured to rotate the cover 20 between the open configuration and the closed configuration. The cover 20 may be configured to fold/bend about a first axis 20A and/or fold/bend about a second axis 20B. The first axis 20A may be substantially vertical (e.g., substantially parallel with the Z-axis) and/or the second axis 20B may be substantially horizontal (e.g., substantially parallel with the X-axis). The first axis 20A may be substantially perpendicular to the second axis 20B. The hinge 28 may facilitate rotation of the cover 20 about the first axis 20A. The cover 20 may be configured to fold about the first axis 20A then fold about the second axis 20B, such as to close around and/or cover the cable 22, the connector 24, and/or the post 26. The cover 20 may be configured to fold approximately 180 degrees about the first axis 20A, and/or the cover 20 may be configured to fold approximately 90 degrees about the second axis 20B. In the closed configuration, the cover 20 may have an L-shaped configuration with a bend 32 that may, for example and without limitation, be about 90 degrees.

In embodiments, a cover 20 may include a first/top portion 34 and/or a second/bottom portion 36. The first portion 34 and/or the second portion 36 may be formed as a monolithic component (e.g., a single, unitary component). The first portion 34 and/or the second portion 36 may include one or more of a variety of shapes, sizes, and/or materials. For example and without limitation, the cover 20 may include an electrically insulating material, such as a plastic and/or polymer. The cover 20 may, for example, not include any metal or electrically conductive material. The first portion 34 and/or the second portion 36 may include sections that may be configured to flex and/or bend to facilitate movement between the open configuration and the closed configuration.

With embodiments, the first portion 34 may include a first section 34A and/or a second section 34B. The first section 34A and the second section 34B may be connected via a hinge 34C that may facilitate relative rotation between the first section 34A and the second section 34B. The second portion 36 may include a first section 36A and/or a second section 36B. The second section 36B may extend substantially perpendicular from the first section 36A such that the second portion 36 may include a generally L-shaped configuration. The second section 36B of the second portion 36 may, for example, be substantially fixed relative to the first section 36A of the second portion 36. The first sections 34A, 36A of the first portion 34 and the second portion 36 may connected via a hinge 28 that may facilitate relative rotation between the first sections 34A, 36A, such as about the first axis 20A.

In embodiments, the first portion 34 may be configured to engage/connect with the second portion 36. When the cover 20 is in the open configuration, the first portion 34 may be connected to the second portion 36 via the hinge 28, but may not otherwise be connected to, in contact with, or engaged with the second portion 36. When the cover 20 is in the closed configuration, the first portion 34 may be engaged with the second portion 36.

With examples, changing a cover 20 from an open configuration to a closed configuration may include rotating the first portion 34 relative to the second portion 36 (or vice versa). A first section 34A of the first portion 34 may be rotated toward the first section 36A of the second portion 36, such as via a hinge 28 about a first axis 20A. Rotation of the first section 34A may continue, for example, until the first section 34A of the first portion 34 engages the first section 36A of the second portion 36. The second section 34B of the first portion 34 may be configured to move with the first section 34A. For example and without limitation, as the first section 34A rotates about the first axis 20A, the second section 34B may also rotate about the first axis 20A and may not be directly connected to the hinge 28. Changing a cover 20 from an open configuration to a closed configuration may include rotating the second section 34B of the first portion 34, such as via a hinge 34C about a second axis 20B. The second section 34B may be rotated while the first section 34A is rotating and/or after the first section 34A has completed rotation (e.g., is engaged with the first section 36A of the second portion 36). Rotation of the second section 34B may continue, for example, until the second section 34B of the first portion 34 engages the second section 36B of the second portion 36.

With embodiments, a first section 36A of the second portion 36 may include a first latch 38 and/or a second latch 40 that may extend laterally outward (e.g., in a Y-direction), such as to engage a corresponding first aperture 42 and/or second aperture 44, respectively, of the first section 34A of the first portion 34. The first latch 38 and/or the second latch 40 may be configured to selectively retain the cover 20 in the closed configuration. When the cover 20 is in the closed configuration, the first sections 34A, 36A of the first portion 34 and the second portion 36 may be latched/locked together. The first latch 38 and/or the second latch 40 may engage the first aperture 42 and/or the second aperture 44 via a snap-fit connection. For example and without limitation, the first latch 38 and/or the second latch 40 may be configured to deflect inward, at least to some degree, upon contacting the first portion 34, such as at or about an edge of the first aperture 42 and/or the second aperture 44. The first latch 38 and/or the second latch 40 may move toward a normal (e.g., non-deflected) position once an end of the first latch 38 and/or an end of the second latch 40 are disposed within the first aperture 42 and/or the second aperture 44 (e.g., snapped into place). The first latch 38 and/or the second latch 40 may facilitate locking the first sections 34A, 36A together. The first latch 38 and the second latch 40 may, for example, be disposed on the same side of the second portion 36. The first latch 38 and/or the second latch 40 may be disposed on an opposite side of the first section 36A of the second portion 36 than the hinge 28.

In embodiments, the first latch 38 may be offset (e.g., in the Z-direction) from the second latch 40 and/or may be aligned with the second latch 40, such as in the X-direction. Similarly, the first aperture 42 and/or the second aperture 44 of the first section 34A of the first portion 34 may be offset in the Z-direction and/or may be aligned in the X-direction. The first section 36A of the second portion 36 may include an extended portion 46 that may extend beyond/below (e.g., in the Z-direction) the first section 34A of the first portion 34. The extended portion 46 may include one or more apertures 48 (e.g., strap apertures) that may be disposed on opposite sides of the extended portion 46 and/or may be configured for receiving a connecting member 48A (e.g., a strap, zip tie, cable tie, etc.) that may be configured for connecting/securing the cable 22 to the second portion 36 (see, e.g., FIGS. 1, 3, and 4A). The extended portion 46 of the second portion 36 may be substantially open when the cover 20 is in an open configuration and when the cover 20 is in a closed configuration, such that the apertures 48 may be configured to at least partially receive a connecting member 48A at substantially all times. Connecting member 48A may remain disposed in the apertures 48 when the cover 20 moves between the open configuration and/or the closed configuration. With examples, a connecting member 48A may connect a cable 22 to the second portion 36 prior to closing the cover 20, such as to hold the cable 22 in place during closing (see, e.g., FIG. 3).

In embodiments, such as generally illustrated in FIGS. 2B and 3, the second section 36B of the second portion 36 may include a third latch 50 and/or a fourth latch 52. The third latch 50 and/or the fourth latch 52 may be disposed in an opposing configuration and/or may extend vertically upward (e.g., in the Z-direction) to engage the second section 34B of the first portion 34. For example and without limitation, the second section 34B of the first portion 34 may include a fifth latch 54 and/or a sixth latch 56 that may be configured to engage the third latch 50 and the fourth latch 52, respectively (see, e.g., FIGS. 1 and 3). The third latch 50 and/or the fourth latch 52 may be configured to extend through respective apertures 58A, 58B in the second section 34B of the first portion 34 to engage the fifth latch 54 and the sixth latch 56, respectively. The third latch 50 and/or the fourth latch 52 may be configured to deflect outward (e.g., away from a center of the second section 36B of the second portion 36) upon contacting the respective apertures 58A, 58B, the fifth latch 54 and/or the sixth latch 56. For example and without limitation, the third latch 50 may be configured to deflect in a first direction (e.g., a first X-direction), and/or the fourth latch 52 may be configured to deflect in a second direction that may be opposite the first direction (e.g., the opposite X-direction).

With embodiments, the fifth latch 54 and/or the sixth latch 56 may extend vertically upward (e.g., in the Z-direction) from the second section 34B of the first portion 34 when the cover 20 is in the closed configuration. The fifth latch 54 and/or the sixth latch 56 may be configured to be actuated (e.g., inward, in the X-direction) to release the third latch 50 and/or fourth latch 52, which may facilitate opening the second section 34B, such as to expose/access the connector 24 and/or the post 26. The fifth latch 54 and/or the sixth latch 56 may be configured to actuate inward toward a center of the second section 34B of the first portion 34 (e.g., the fifth latch 54 and/or the sixth latch 56 may actuate in opposite directions and/or may be pinched toward each other by a user).

In embodiments, such as generally illustrated in FIGS. 3-5G, the third latch 50, the fourth latch 52, the fifth latch 54, and/or the sixth latch 56 may include engagement surfaces 60, 62, 64, 66, respectively. For example and without limitation, when the second section 34B of the first portion 34 is substantially connected with the second section 36B of the second portion 36, the engagement surfaces 60, 64 of the third latch 50 and the fifth latch 54 may be in contact/engaged with each other, and/or the engagement surfaces 62, 66 of the fourth latch 52 and the sixth latch 56 may be in contact/engaged with each other. When disconnecting the second section 34B of the first portion 34 from the second section 36B of the second portion 36, the fifth latch 54 may be moved inwards such that the engagement surface 64 of the fifth latch 54 may not be in contact/aligned with the engagement surface 60 of the third latch 50, which may allow the third latch 50 to move (e.g., slide) through the respective aperture 58 of the second section 34B of the first portion 34. Additionally or alternatively, when disconnecting the second section 34B of the first portion 34 from the second section 36B of the second portion 36, the sixth latch 56 may be moved inwards such that the engagement surface 66 of the sixth latch 56 may not be in contact/aligned with the engagement surface 62 of the fourth latch 52, which may allow the fourth latch 52 to move (e.g., slide) through the respective aperture 58 of the second section 34B of the first portion 34.

With embodiments, the second section 34B of the first portion 34 may include an overlapping section 70 that, in the closed configuration of the cover 20, may be in contact with and/or supported by a bearing surface 72 (e.g., a planar/horizontal surface) of the first section 34A of the first portion 34. An inner surface 72A of the bearing surface 72 may be curved and/or may be aligned with the bend 32 of the second portion 36. The inner surface 72A of the bearing surface 72 and the bend 32 may be configured such that a cable 22 and/or a connector 24 may be disposed at least partially between the bend 32 and the inner surface 72A of the bearing surface 72. The second section 34B of the first portion 34 may include a cap 74 that may be configured to at least partially cover and/or receive the post 26. Engagement of the third latch 50 and/or the fourth latch 52 with the fifth latch 54 and/or the sixth latch 56, respectively, may restrict movement of the cap 74 and/or prevent the cap 74 from inadvertently uncovering the post 26. When the cover 20 is in the closed configuration, movement of the cover 20 may be substantially limited in at least one direction. The cap 74 may, for example and without limitation, include a generally tapered cylindrical/conical configuration.

With embodiments, such as generally illustrated in FIG. 6, a method 80 of connecting a cover 20 may include providing a cover 20, a cable 22, a connector 24, and/or a post 26 (step 82). The cover 20 may include a first/top portion 34 and a second/bottom portion 36. The first portion 34 may include a first/vertical section 34A and/or a second/horizontal section 34B. The second portion 36 may include a second/horizontal section 36B and/or a first/vertical section 36A. Providing the cover 20 may include forming the cover 20 as a monolithic component (e.g., a single, unitary member). A cover 20 may, for example and without limitation, be formed via additive manufacturing. The second portion 36 may be formed with a bend 32 (e.g., about a 90-degree bend) that may connect the first section 36A with the second section 36B. In an initial configuration (e.g., an open configuration), the first section 34A of the first portion 34 may be disposed/extend substantially parallel to the second section 34B of the first portion 34. Additionally or alternatively, the first section 36A of the second portion 36 may be disposed substantially perpendicular to the second section 36B in some or all configurations (e.g., may be fixed in a substantially perpendicular orientation). Providing the cable 22 and the cover 20 may include connecting the cable 22 with the cover 20, such as via a connecting member 48A.

In embodiments, the first section 34A of the first portion 34 and the first section 36A of the second portion 36 may be rotated relative to each other, such as about a first axis 20A (step 84). Rotation may continue until the first section 34A of the first portion 34 and the first section 36A of the second portion 36 are closed, which may include a first latch 38 and/or a second latch 40 of the first section 36A of the second portion 36 engaging a first aperture 42 and/or a second aperture 44, respectively, of the first section 34A of the first portion 34 (step 86). Additionally or alternatively, the first section 34A of the first portion 34 may include latches 38, 40 and the first section 36A of the second portion 36 may include apertures 42, 44, and/or the first section 34A, 36A may each include a combination of latches and apertures. The first section 34A of the first portion 34 and the first section 36A of the second portion 36 may be closed at least partially around a cable 22, such as a battery cable. In a closed configuration, the first section 34A of the first portion 34 and the first section 36A of the second portion 36 may provide a generally rectangular chamber that may be configured to at least partially receive a cable 22.

In embodiments, the second section 34B of the first portion 34 may be rotated relative to the first section 34A of the first portion 34 via a hinge 34C about a second axis 20B that may be aligned with an X-direction. Rotation may continue until the second section 34B of the first portion 34 connects with the second section 36B of the second portion 36 (step 88), which may include a third latch 50 and/or a fourth latch 52 of the second section 36B of the second portion 36 engaging a fifth latch 54 and/or a sixth latch 56, respectively, of the second section 34B of the first portion 34 (step 90). During engagement, the third latch 50 and/or the fourth latch 52 may initially deflect outward (e.g., in an X-direction). Additionally or alternatively, during engagement, the fifth latch 54 and/or the sixth latch 56 may initially deflect inward. Connecting the second section 34B of the first portion 34 with the second section 36B of the second portion 36 may include a cap 74 of the second section 34B of the first portion 34 at least partially covering a post 26, such as an electrical post/terminal 26 of a generator 30. Connecting the second section 34B of the first portion 34 with the second section 36B of the second portion 36 may include disposing an overlapping section 70 of the second section 34B of the first portion 34 on a bearing surface 72 of the first section 34A of the first portion 34. A hinge 34C may connect the first section 34A of the first portion 34 with the second section 34B of the first portion 34.

With embodiments, disconnecting the cover 20 may include actuating the fifth latch 54 and/or the sixth latch 56, such as in an inward direction (e.g., an X-direction), which may release the third latch 50 and/or the fourth latch 52 from engagement with the second section 34B of the first portion 34. Actuating the fifth latch 54 may disengage the engagement surfaces 64, 60 of the fifth latch 54 and the third latch 50, such that the third latch 50 may pass through an aperture 58A of the second section 34B of the first portion 34 substantially without interference. Actuating the sixth latch 56 may disengage the engagement surfaces 66, 62 of the sixth latch 56 and the fourth latch 52, such that the fourth latch 52 may pass through an aperture 58B of the horizontal portion 54B substantially without interference. The cover 20 may move from the closed configuration to the open configuration when both of the third latch 50 and the fourth latch 52 are not substantially engaged and/or aligned with the fifth latch 54 and the sixth latch 56, respectively. The second section 34B of the first portion 34 may be rotated about the second axis 20B such that the cap 74 no longer covers the post 26 and/or such that the second section 34B of the first portion 34 is substantially parallel with the first section 34A of the first portion 34. The first latch 38 and second latch 40 may be disengaged from the first aperture 42 and the second aperture 44, such as via bending/deflecting the first latch 38 and the second latch 40 and/or via bending the first section 34A of the first portion 34, which may permit relative rotation between the first sections 34A, 36A, such as to fully open the cover 20.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A cover, comprising:
   a first portion including a first section and a second section; and
   a second portion including a first section and a second section;
   wherein the first section of the first portion and the first section of the second portion are rotatably connected to each other;
   the first section of the first portion and the second section of the first portion are rotatably connected to each other;
   the cover includes a first configuration and a second configuration;
   the first portion is not engaged with the second portion when the cover is in the first configuration;
   the first section of the first portion is substantially parallel to the second section of the first portion in the first configuration and is substantially perpendicular to the second section of the first portion in the second configuration;
   the first section of the first portion is engaged with the first section of the second portion when the cover is in the second configuration, and
   the second section of the first portion includes an overlapping section that, in the second configuration, is in contact with a planar bearing surface of the first section of the first portion.

2. The cover of claim 1, wherein the first section of the first portion and the first section of the second portion are configured to rotate about a first axis;
   the first section of the first portion and the second section of the first portion are configured to rotate about a second axis; and
   the first axis is substantially perpendicular to the second axis.

3. The cover of claim 1, wherein the first section of the second portion includes a first latch and a second latch configured to engage corresponding apertures of the first section of the first portion to connect the first section of the first portion with the first section of the second portion.

4. The cover of claim 1, wherein the first section of the second portion and the second section of the second portion are substantially perpendicular to each other in the first configuration and the second configuration.

5. The cover of claim 1, wherein an inner surface of the planar bearing surface is curved and is aligned with a bend of the second portion.

6. The cover of claim 1, wherein the first portion and the second portion of the cover are substantially L-shaped when in the second configuration.

7. The cover of claim 1, wherein the cover is formed as a monolithic component;
   the first section of the second portion includes an extension having a plurality of connecting member apertures; and
   the extension extends beyond the first section of the first portion.

8. The cover of claim 1, including a hinge; wherein the first section of the first portion and the first section of the second portion are rotatably connected via the hinge; and the hinge is configured to permit relative rotation of about 180 degrees between the first section of the first portion and the first section of the second portion.

9. The cover of claim 8, including a second hinge; the second hinge is configured to rotatably connect the second section of the first portion with the first section of the first portion; and the second hinge is configured to permit relative rotation of at least about 90 degrees of the second section of the first portion and the first section of the first portion.

10. The cover of claim 1, wherein the cover is formed as a monolithic component.

11. A cover, comprising:
  a first portion including a first section and a second section; and
  a second portion including a first section and a second section;
  wherein the first section of the first portion and the first section of the second portion are rotatably connected to each other;
  the first section of the first portion and the second section of the first portion are rotatably connected to each other;
  the cover includes a first configuration and a second configuration;
  the first portion is not engaged with the second portion when the cover is in the first configuration;
  the first section of the first portion is substantially parallel to the second section of the first portion in the first configuration and is substantially perpendicular to the second section of the first portion in the second configuration;
  the first section of the first portion is engaged with the first section of the second portion when the cover is in the second configuration;
  the first section of the second portion includes a first latch and a second latch configured to engage corresponding apertures of the first section of the first portion to connect the first section of the first portion with the first section of the second portion; and
  the second section of the second portion includes a third latch and a fourth latch that are configured to extend into respective apertures of the second section of the first portion to engage a fifth latch and a sixth latch of the second section of the first portion to connect the second section of the first portion with the second section of the second portion.

12. The cover of claim 11, wherein the fifth latch and the sixth latch are configured for actuation to release the third latch and the fourth latch; and
  the third latch and the fourth latch are configured to deflect outward during insertion into the respective apertures.

13. The cover of claim 11, wherein the fifth latch and the sixth latch are configured to be actuated in opposite directions to release the third latch and the fourth latch; and
  the third latch and the fourth latch that are configured to extend into and through the respective apertures.

14. The cover of claim 13, wherein the third latch, the fourth latch, the fifth latch, and the sixth latch each include a respective engagement surface; and
  the second section of the first portion is configured to be disengaged from the second section of the second portion when (i) the engagement surface of the third latch is disengaged from and not aligned with the engagement surface of the fifth latch, and (ii) the engagement surface of the fourth latch is disengaged from and not aligned with the engagement surface of the sixth latch.

15. The cover of claim 11, wherein the second section of the first portion includes an overlapping section that, in the second configuration, is in contact with a planar bearing surface of the first section of the first portion.

16. A method of connecting a cover having a first portion and a second portion, the method comprising:
  connecting a first section of the first portion with a first section of the second portion by rotating at least one of the first section of the first portion and the first section of the second portion about a first axis; and
  connecting a second section of the first portion with a second section of the second portion by rotating at least one of the second section of the first portion and the second section of the second portion about the first axis and a second axis;
  wherein the first axis is substantially perpendicular to the second axis; and
  the first section and the second section of the second portion are perpendicular to each other while (i) connecting the first section of the first portion with the first section of the second portion, and (ii) connecting the second section of the first portion with the second section of the second portion.

17. The method of claim 16, wherein connecting the first section of the first portion with the first section of the second portion includes a first latch and a second latch of the first section of the second portion substantially engaging a first aperture and a second aperture of the first section of the first portion.

18. The method of claim 16, wherein connecting the second section of the first portion with the second section of the second portion includes a third latch and a fourth latch of the second section of the second portion substantially engaging a fifth latch and a sixth latch of the second section of the first portion.

19. The method of claim 18, including disengaging the second section of the first portion from the second section of the second portion;
  wherein disengaging includes bending the fifth latch and the sixth latch towards a center of the second section of the first portion.

20. The method of claim 16, wherein the cover is configured as a monolithic component; and
  the first portion and the second portion of the cover are substantially L-shaped when the second section of the first portion is engaged with the second section of the second portion.

* * * * *